United States Patent [19]

Seno et al.

[11] Patent Number: 5,590,328
[45] Date of Patent: Dec. 31, 1996

[54] PROTOCOL PARALLEL PROCESSING APPARATUS HAVING A PLURALITY OF CPUS ALLOCATED TO PROCESS HIERARCHICAL PROTOCOLS

[75] Inventors: Shoichiro Seno; Tetsuo Ideguchi, both of Kanagawa-ken, Japan

[73] Assignee: Mitsubishi Denki Kabushiki Kaisha, Tokyo, Japan

[21] Appl. No.: 399,331

[22] Filed: Mar. 6, 1995

Related U.S. Application Data

[63] Continuation of Ser. No. 907,833, Jul. 2, 1992, abandoned.

[30] Foreign Application Priority Data

Jul. 25, 1991 [JP] Japan .................................. 3-208558

[51] Int. Cl.$^6$ ........................................................ G06F 13/00
[52] U.S. Cl. ........................................ 395/675; 395/200.1
[58] Field of Search .................................. 395/650, 375, 395/700, 775, 200.1

[56] References Cited

U.S. PATENT DOCUMENTS

| | | | |
|---|---|---|---|
| 4,325,120 | 4/1982 | Colley et al. | 395/375 |
| 4,402,046 | 8/1983 | Cox et al. | 395/375 |
| 4,530,054 | 7/1985 | Hamstra et al. | 395/550 |
| 4,654,654 | 3/1987 | Butler et al. | 340/825.5 |
| 4,766,534 | 8/1988 | DeBenedictis | 379/221 |
| 4,821,265 | 4/1989 | Albal et al. | 370/110.1 |
| 4,852,001 | 7/1989 | Tsushima et al. | 364/401 |
| 4,949,338 | 8/1990 | Albal et al. | 370/85.6 |
| 5,043,882 | 8/1991 | Ikeno | 364/243.2 |
| 5,146,590 | 9/1992 | Lorie et al. | 395/600 |
| 5,159,686 | 10/1992 | Chastain et al. | 395/650 |
| 5,191,652 | 3/1993 | Dias et al. | 395/200 |
| 5,261,109 | 11/1993 | Cadambi et al. | 395/725 |
| 5,283,897 | 2/1994 | Georgiadis et al. | 395/650 |
| 5,349,656 | 9/1994 | Kaneko et al. | 395/650 |

FOREIGN PATENT DOCUMENTS

| | | |
|---|---|---|
| 61-296892 | 7/1986 | Japan . |
| 61-63139 | 8/1986 | Japan . |

OTHER PUBLICATIONS

Bounds on multiprocessing timing anomalies by Graham, 1969 SIAM publication. pp. 416–429.
Lower bound on the number of processors and time for scheduling precedence graphs with communication costs by Al–Mouhamed, IEEE 1990, pp. 1390–1401.
Dynamic Load Balancing Algorithms in Loosely–Coupled Real–Time Systems by Cheng et al, IEEE Publication 143–148, 1992.
A Task Migration Algorithm for Load Balancing in a Distributed System, 1989 IEEE Publication, pp. 1041–1048.

*Primary Examiner*—William M. Treat
*Assistant Examiner*—Zarni Maung
*Attorney, Agent, or Firm*—Wolf, Greenfield & Sacks, P.C.

[57] ABSTRACT

A protocol processing apparatus is presented having a plurality of CPUs for processing communication protocol data in parallel so as to achieve a high measure of efficiency. The apparatus provides a common memory including a CPU state table that is accessible by the plurality of CPUs. The CPU state table associates an idle flag, a remote node identifier, and a process start time with each of the plurality of CPUs. At least one line interface selects a CPU from the plurality of CPUs according to the contents of the CPU state table, selecting an idle CPU if one is available, selecting a CPU with the oldest process start time if no idle CPU is available, or selecting a busy CPU if the communication data to be processed is related to communication data already running on the busy CPU.

20 Claims, 5 Drawing Sheets

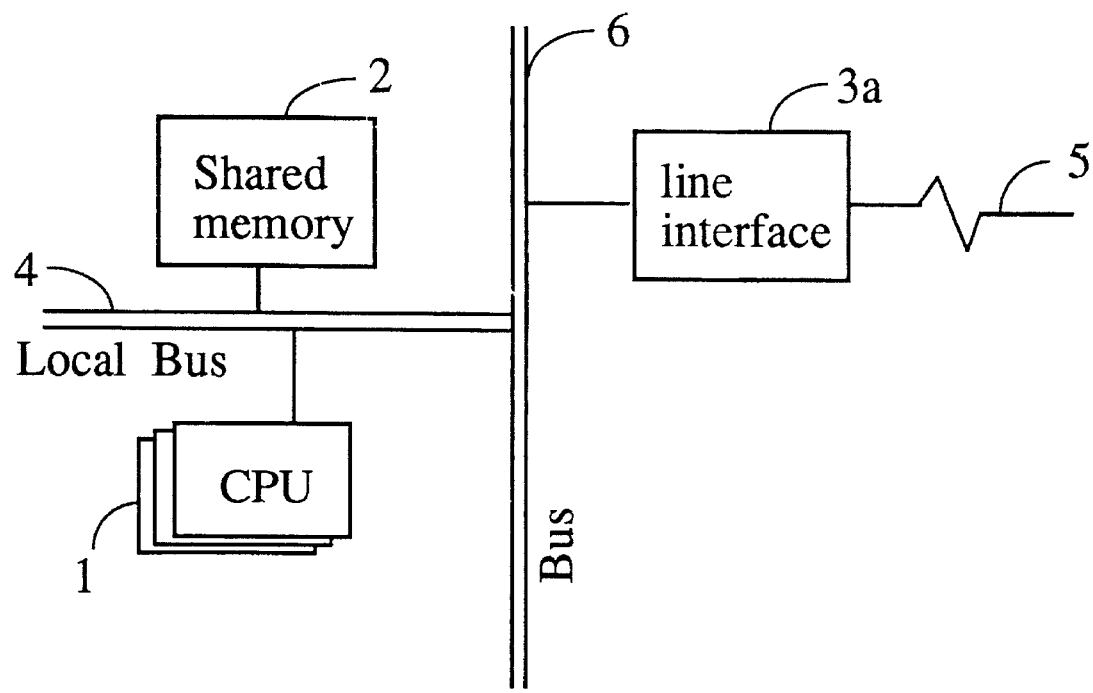
F I G. 1
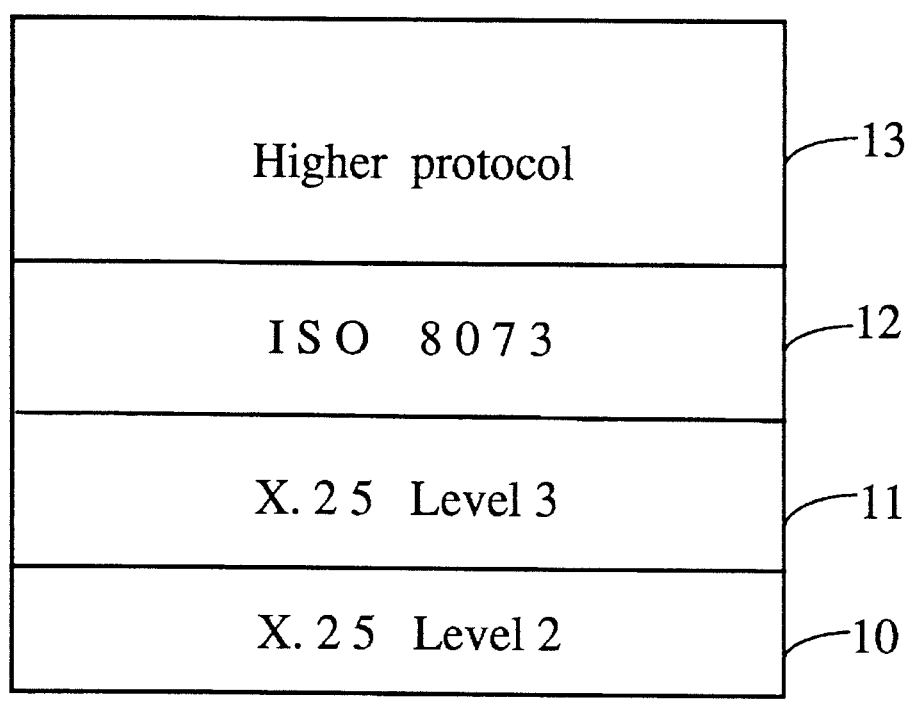
F I G. 2

| CPU number (30) | Idle flag (31) | Remote address (32) | Logical channel number (33) | Process starting time (34) |
|---|---|---|---|---|
| 1 | 0 | A | 0 | 0 0 0 2 |
| 2 | 1 | B | 1 | 0 1 0 7 |
| ⋮ | ⋮ | ⋮ | ⋮ | ⋮ |
| 10 | 0 | L | 5 | 0 0 5 1 |

FIG. 5

| CPU number (30) | Idle flag (31) | Connection number (36) | Process starting time (34) |
|---|---|---|---|
| 1 | 0 | 0 0 0 3 | 0 0 0 2 |
| 2 | 1 | 0 0 3 1 | 0 1 1 0 |
| ⋮ | ⋮ | ⋮ | ⋮ |
| 10 | 0 | 0 0 0 4 | 0 0 0 5 |

FIG. 6

PROTOCOL PARALLEL PROCESSING APPARATUS HAVING A PLURALITY OF CPUS ALLOCATED TO PROCESS HIERARCHICAL PROTOCOLS

This application is a continuation of application Ser. No. 07/907,833, filed Jul. 2, 1992, now abandoned.

BACKGROUND OF THE INVENTION

The invention relates to a protocol parallel processing apparatus for processing protocol in parallel at the node or terminal of the communication systems.

In the conventional telecommunication systems, each communication node or communication terminal usually processes the protocol using one CPU. If the apparatus has a plurality of CPUs such as a concentrator or a switching apparatus, the CPUs are fixedly allocated for every line or every mode of protocol such as (a) an allocation corresponding to the physical connection in which CPUs are allocated for every line or every set of the lines, or (b) an allocation corresponding to the protocol architecture in which CPUs are allocated for every layered protocol.

FIG. 9 is a block diagram of a conventional protocol processing apparatus described in the laid-open patent publication No. 61-173554, "Packet communication apparatus". In the figure, 101 is a frame processing circuit for processing the second layer of the hierarchical protocol such as the OSI protocol. 102 is a packet processing circuit for processing the third layer. 103 is a central processing portion for processing higher layers. 104 is a communication line. 105 and 106 are buses. The apparatus is allocated corresponding to the protocol construction as easily understood from the allocation of the frame processing circuit 101, the packet processing circuit 102 and the central processing portion 103.

In FIG. 9, since each of the frame processing circuit 101, the packet processing circuit 102 or the central processing portion 103 is comprised of one CPU or exclusive LSI (Large Scale Integrated circuit) and memories, the conventional protocol processing apparatus is comprised of a plurality of CPUs, each having a respective role corresponding to the protocol construction.

The protocol processing operation of the apparatus shown in FIG. 9 is explained here. In the OSI protocol representing the layered protocol, a set of information referred to as protocol data unit (PDU) is defined in each layer of the protocol and the protocol processing operation is carried out thereto. PDU is comprised of protocol control information and data. The higher layer PDU is inserted into the lower layer PDU as data. In case of PDU received from the line, the protocol is processed in turn from the lower layer to the higher layer, and in case of PDU being transmitted to the line, in turn from the higher layer to lower layer.

Accordingly, when the PDU is received through the communication line 104, the frame processing circuit 101 processes the second layer protocol at first, then processes the third layer PDU for the received PDU, and transfers the process to the central processing portion 103 if the received PDU includes a fourth layer PDU. Inversely, in case of transmitting PDU to the communication line, PDU having finished being processed in the central processing portion 103 is generated and transferred to the packet processing circuit 102. The packet processing circuit 102 generates a third layer PDU by adding third layer protocol control information to the PDU generated in the central processing portion 103 and transfers it to the frame processing circuit 101.

The frame processing circuit 101 generates a second layer PDU by adding second layer protocol control information to the PDU generated in the packet processing circuit 102 and transmits it to the communication line 104. In the conventional protocol processing apparatus, since each CPU is allocated to the respective process in the system, it is impossible to flexibly allocate other processes to the idle CPU having no job to be processed.

As described above, in the conventional protocol processing apparatus, since each processing object of the CPU is fixedly decided depending on the physical or logical construction of the communication system if the apparatus includes a plurality of CPUs in the system, the jobs of the CPUs are not necessarily effectively allocated and the performance of the CPU does not give full play.

In FIG. 9, since a plurality of CPUs have their assigned roles according to the protocol layer, if the load varies for every layer in accordance with the traffic variation or the environment of the apparatus, the CPUs can not follow the variation of the load. Accordingly all CPU can not always give full play. As a result, some resources of the apparatus will be lost without use. If loads concentrate to the specific CPU in response to the variation of the traffic, congestion occurs and the throughput of the apparatus is greatly decreased.

It is an object of the present invention to provide a parallel processing apparatus, in which the assigned roles to the plurality of CPU are not fixed to the special layers, the jobs are allocated dynamically so that the CPUs may not wait for idle processing time and the protocol processing are carried out in parallel on the plurality of the CPUs.

SUMMARY OF THE INVENTION a protocol parallel processing apparatus of a first aspect of the present invention comprises a plurality of CPUs, a shared memory accessed by each CPU for storing a remote address included in the communication data, a CPU state table allocated by a set of the physical number corresponding to the remote address and communication data, one or more line interfaces for searching a remote address and the CPU state table when the protocol data are processed, and requesting an appropriate CPU to process the communication processing, or requesting a CPU having high potentiality of immediate operation to process the communication processing if the appropriate CPU is busy.

a protocol parallel processing apparatus of a second aspect of the present invention comprises a plurality of CPUs, a shared memory accessed by each CPU for storing a CPU state table allocated by a necessary logical connection number and a set of the physical number of the CPU corresponding to the connection number and communication data when a new communication connection is established, one or more line interfaces for searching the CPU state table according to the connection number when the protocol data are processed, and requesting an appropriate CPU to process the communication processing, or requesting a CPU having high potentiality of immediate operation to process the communication processing if the appropriate CPU is busy.

BRIEF DESCRIPTION OF THE DRAWING

FIG. 1 is a block diagram of a hardware construction of an embodiment of the present invention.

FIG. 2 shows a layered protocol for explaining the first embodiment.

FIG. 5 is an example of a CPU state table.

FIG. 6 is an example of a CPU state table when the connection number is used for selecting a CPU.

DETAILED DESCRIPTION OF THE PREFERRED EMBODIMENTS

Figure 3:
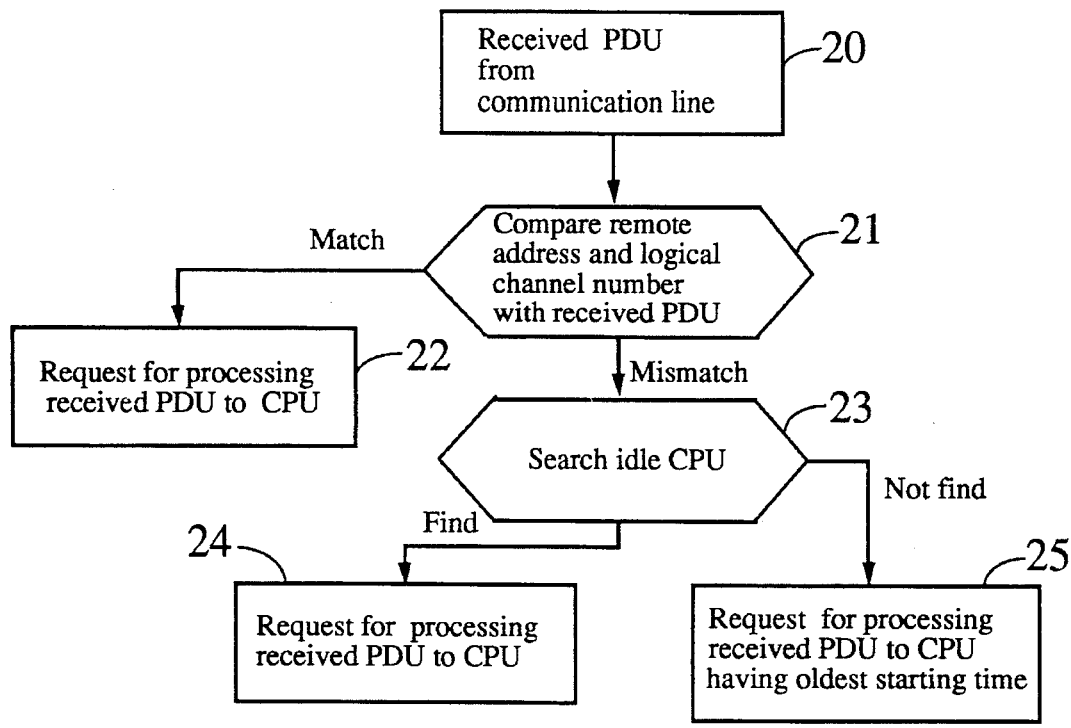
FIG. 3 is a flowchart showing a transfer procedure of the received PDU to the CPU 1 when the line interface 3 has received a PDU indicating a remote address or logical channel number.

FIG. 1 is a block diagram of a hardware construction of an embodiment of the present invention. In FIG. 1, 1 are a plurality of CPUs. 2 is a shared memory. 3 is a line interface for connecting with the communication line. 4 is a local bus used for accessing the shared memory 2 from the CPU 1 in high speed. 5 is a communication line. 6 is a bus.

The operation of the protocol processing is explained here. When the system receives PDU from the communication line 5, the line interface 3 writes the PDU into the shared memory 2 and selects one of the appropriate CPUs 1 and requests a processing to be processed by the selected CPU. The selected one of the CPUs 1 processes the received PDU by a series of protocol from the lower layer to the higher layer. Thus, the system selects an appropriate CPU out of the idle CPUs. Therefore, the idle CPUs are effectively used in this system. If there is no idle CPU in the system when it is necessary, the system selects the CPU which is going to be idle most promptly and requests it to process the PDU.

When the received PDU has any relation with the in-processing PDUs, the received PDU can not be processed in parallel with a plurality of PDUs. In that case, the PDU requests are arranged in a queue state in order that the CPU processes the received PDU after the in-processing CPUs have finished their processings even if the requested destination is busy.

The above operation is the same as that for a transmitted PDU. When the PDU is transmitted, a data portion of the PDU is provided in the shared memory and the transmit condition is requested to an appropriate CPU selected as one of the CPUs. The PDU request is sent to any idle CPU which can process the PDU. If there is no idle CPU in the system, the system selects the CPU which is going to be idle most promptly and requests it to process the PDU. When the system can not process a plurality of PDUs in parallel because the transmitting PDU has any relation with the in-processing PDU, the transmitting PDU is requested to the in processing CPU. After the in-processing CPU has finished the processing, the PDU is transmitted from the shared memory 2 to the communication line 5 through the line interface 3.

The term "a PDU to be processed has any relation with the in-processing PDU" means, for example, a case when the disconnection instruction is received during transmitting a response for connection establishment in the connection mode protocol, or a case when a received PDU is reassembled in the connection mode protocol.

The protocol processing operation of the first embodiment of the present invention is explained in detail in case of processing CCITT (International Telegraph and Telephone Consultative Committee) recommendation X.25 and ISO 8073 "Connection oriented transport protocol specification" (JIS X. 5109) as a protocol which is one of the connection-less-mode protocol, respectively. This is a typical protocol construction in which the communication line 5 is connected with a packet switching network.

FIG. 2 shows a layered protocol for explaining the first embodiment. In FIG. 2, 10 is an X.25 level 2 corresponding to the second layer of OSI. 11 is an X.25 level 3 corresponding to the third layer of OSI. 12 is a ISO 8073 corresponding to the fourth layer of OSI. 13 is a higher protocol than the fourth layer 12. The X.25 level 2 10 is processed by the private hardware in the line interface 3, and the processes from the X.25 level 3 11 to the higher protocol 13 is executed by the CPU 1.

FIG. 3 is a flowchart showing a transfer procedure of the received PDU to the CPU 1 when the line interface 3 has received a PDU. The line interface 3 receives a PDU from the communication line 5 in step 20, then an appropriate CPU is selected from a plurality of CPUs. The necessary information for selection is stored in the shared memory 2 as a CPU state table.

FIG. 5 is an example of the CPU state table. The CPU 1 updates contents of the CPU state table in response to its own operation.

In FIG. 5, 30 is a CPU number field, 31 is an idle flag field, 32 is a remote address field, 33 is a logical channel number field of the V.25 level 3 and 34 is a process starting time field. When one of the CPUs 1 begins to process the job, the CPU rewrites the information in the field having the CPU number 30 allocated to itself in the CPU state table. That is, the CPU sets zero into the idle flag field 31, then writes a remote network address into the remote address field 32, then writes a logical channel number used into the logical channel number field 33 and then writes a process starting time into the process starting time field 34.

When the CPU has finished all the above processes, the CPU sets "1" into the idle flag field 31, then overwrites constant values, which are different from the values used during the processing, into the remote address field 32, the logical channel number field 33 and the process starting time field 34. In the X.25 level 3 protocol, the network address is informed each other by the PDU at the connection establishment. But, after the connection is established, the logical channel number in the PDUs decided at the connection establishing is used to identify the connection.

In the step 21 of FIG. 3, the line interface 3 compares an remote address 32 in the CPU state table with a source address if the received PDU includes a source address, if not, the line interface 3 compares a logical channel number 33 in the CPU state table with a logical channel number in the received PDU and checks whether the same number exists or not. If the same number is detected, the step 21 moves to a step 22. The step 22 requests the corresponding CPU to process the received PDU.

If the step 21 can not find both the same address or the same logical channel number in the step 21, the step 21 moves to a step 23. The step 23 checks an idle flag 31 in the CPU state table. If the step 23 finds the CPU corresponding to the idle flag 31, the step 23 moves to a step 24. The step 24 requests the CPU to process the received PDU. If all idle flags 31 corresponding to all CPUs are "0", that is, in case of no idle CPU, the step 23 moves to a step 25. The step 25 searches all process starting time field 34 in the CPU state table and selects a CPU having the oldest starting time and requests the CPU to process the received PDU.

The second embodiment of the present invention is explained here. In the second embodiment, ISO 8473 "protocol for providing the connectionless-mode network service" which is one of the connectionless-mode protocols and the processing protocol ISO 8073 (JIS X 5109) are explained in detail in the construction of FIG. 1. This protocol is a typical construction in which the communication line 5 is connected to a local area network (LAN). In this case, some of the operation is the same, therefore only different points between the two protocols are explained here.

In the layered protocol shown in FIG. 2, X.25 level 2 10 is changed to ISO international standard ISO 8802, and X.25 level 3 11 is changed to ISO 8473. In the flowchart representing the transfer procedure of the received PDU in FIG. 3, since ISO 8473 does not use the logical channel and all the PDU includes a source address, respectively, the step 21 does not compare the logical channel number but compares all the remote addresses. Therefore, in the second embodiment, the logical channel number 33 in the CPU state table in FIG. 5 is not used. Other processings are the same as those described in the first embodiment.

In the above embodiment, ISO 8073, CCITT recommendation X.25 and ISO 8473 are described as one of the protocols applied to this invention. But, other connection mode protocol such as a session layer protocol defined by ISO 8327 "Basic connection oriented session protocol specification" (JIS X.5202) or, other connectionless-mode protocols such as the Internet protocol can be processed in parallel in the same way.

Figure 4:
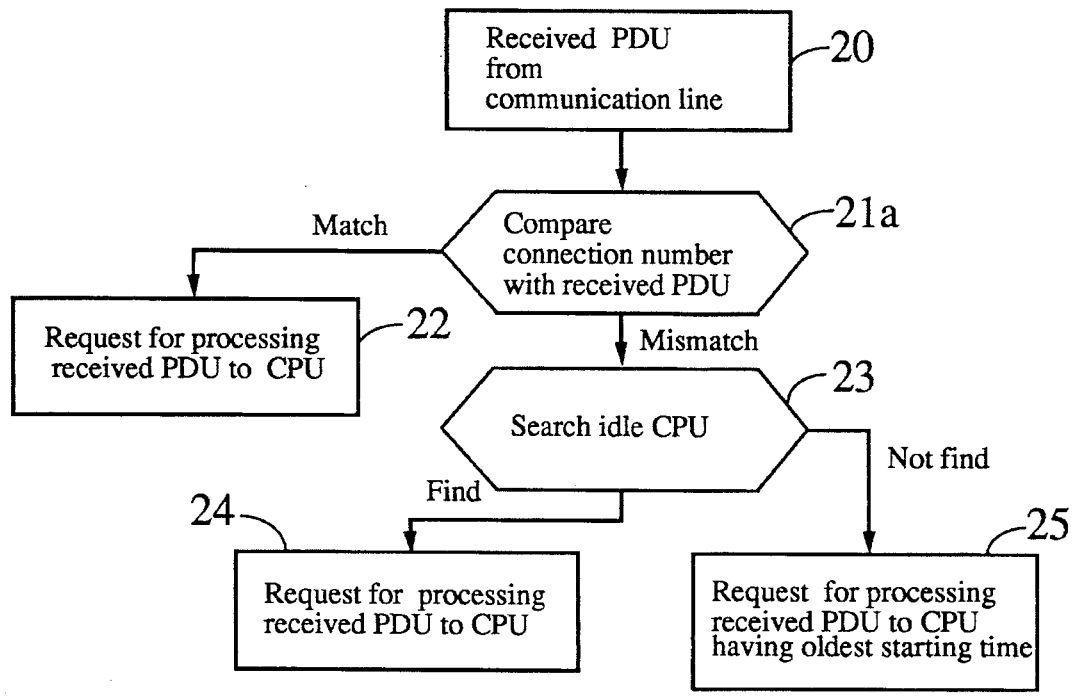
FIG. 4 is a flowchart showing another embodiment of a transfer procedure of the received PDU to the CPU 1.

The operation of the protocol processing apparatus of the second embodiment of the present invention is explained here in reference to the connection mode protocol using FIG. 4 and FIG. 6.

FIG. 6 shows one example of a CPU state table when the connection number is used for selecting a CPU. In FIG. 6, 36 shows a connection number. 30, 31 and 34 are the same as those in FIG. 5. When one of the CPUs starts to process the job, the CPU rewrites the information in the field having the CPU number 30 allocated to itself in the CPU state table as shown in FIG. 6.

That is, the CPU sets zero into the idle flag field 31, then writes a connection number which is now being processed into the connection number field 36, then writes a process starting time into the process starting time field 34. When the CPU has finished all the above processes, the CPU sets "1" into the idle flag field 31, then clears the connection number field 36 and the process starting time field 34.

The connection number described above corresponds to a connection identifier which is allocated at every time when the new connection is established. Since the connection number is a closed number allocated in the apparatus, it is different from the logical channel number which is allocated in the network and carried by the PDU.

FIG. 4 is a flowchart showing a transfer procedure of the received PDU to the CPU 1 when the line interface 3 has received a PDU. In FIG. 6, the line interface 3 receives a PDU from the communication line 5 in step 20, then an appropriate CPU is selected from a plurality of CPUs. The necessary information for selection is stored in the shared memory 2 as a CPU state table.

FIG. 6 is an example of the CPU state table. The CPU 1 updates the contents of the CPU state table in response to its own operation.

In FIG. 6, 30 is a CPU number field, 31 is an idle flag field, 36 is an connection number field and 34 is a process starting time field. When one of the CPU 1 starts to process the job, the CPU rewrites the information in the field having the CPU number 30 allocated to itself in the CPU state table. That is, the CPU sets "zero" into the idle flag field 31, then writes a connection number in the connection number field 34, and then writes a process starting time into the process starting time field 34.

When the CPU has finished all the above processes, the CPU sets "1" into the idle flag field 31, then overwrites constant values, which are different from the values used during the processing, into the connection number field 36 and the process starting time field 34.

In the step 21a of FIG. 4, the line interface 3 compares a connection number 36 in the CPU state table with a connection number determined from the received PDU if possible, and checks whether the same connection number exists or not. If the same number is detected, the step 21a moves to a step 22. The, step 22 requests the corresponding CPU to process the received PDU.

If the step 21a can not find the same connection number, the step 21a moves to a step 23. The step 23 checks an idle flag 31 in the CPU state table. If the step 23 finds the CPU corresponding to the idle flag 31, the step 23 moves to a step 24. The step 24 requests the CPU to process the received PDU. If all idle flags 31 corresponding to all CPUs are "0", that is, in case of no idle CPU, the step 23 moves to a step 25. The step 25 searches all process starting time field 34 in the CPU state table and selects a CPU having the oldest starting time and requests the CPU to process the received PDU.

Figure 7:
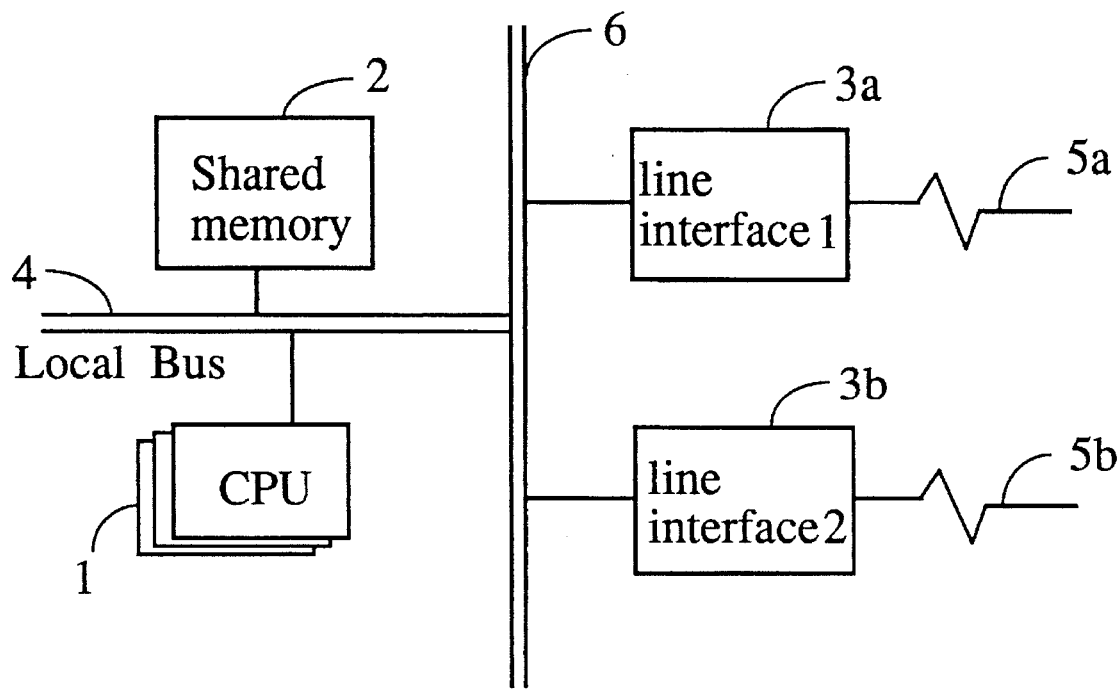
FIG. 7 is a block diagram of another embodiment of the present invention having a plurality of communication lines.

In the embodiment in FIG. 1, the system has only one communication line 5 and one line interface 6. In the other embodiment shown in FIG. 7, the system has a plurality of communication lines 5a, 5b and line interfaces 3a, 3b. In FIG. 7, the system can relay the PDU or communicate with many remote side systems at the same time through the plurality of communication lines and line interfaces. This invention can be applied to such protocol processing system having a plurality of line interfaces and communication lines shown in FIG. 7.

In FIG. 7, 5a, 5b are communication lines, 3a, 3b are line interfaces. Other protocol (CPU 1, shared memory 2, local bus 4 and bus 6) are the same as those in FIG. 1.

Figure 8:
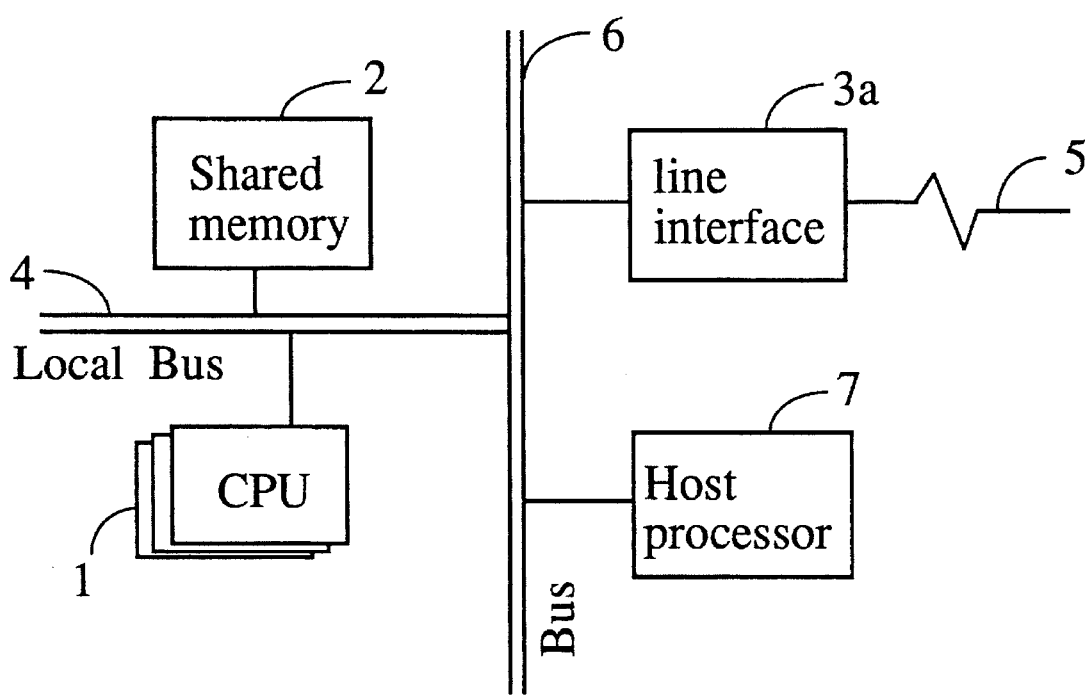
FIG. 8 is a block diagram of another embodiment of the present invention having a communication line and host processor.
Figure 9:
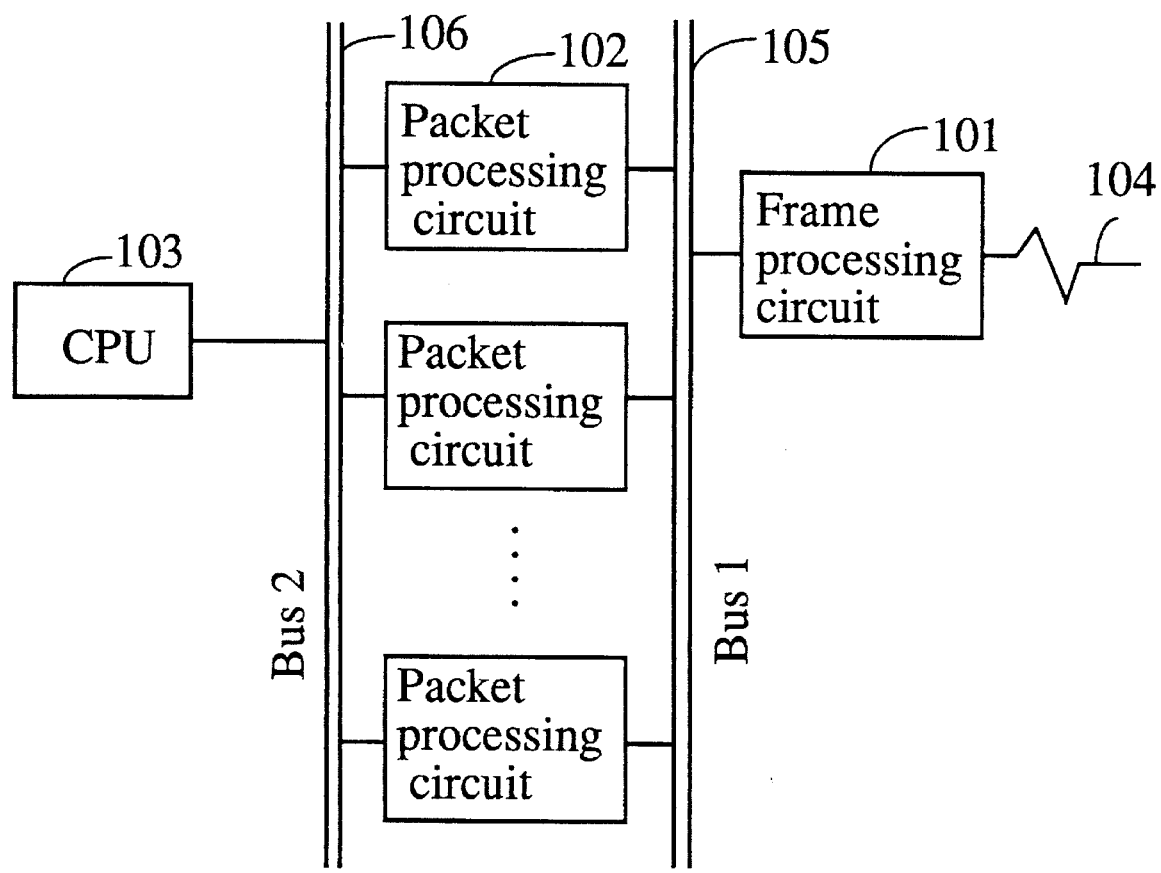
FIG. 9 is a block diagram of the conventional protocol processing apparatus.

FIG. 8 shows another embodiment of the present invention. In FIG. 8, 7 is a host processor, and other portions are the same as those in FIG. 1. In FIG. 8, the protocol processing apparatus comprises a host processor 7 and is used as a front end processor.

The host processor 7 processes an application layer of the hierarchical protocol or higher hierarchical processes than the application layer. The portions except host processor 7 in FIG. 8 processes protocols lower layer than layer processed by the host processor 7.

The host processor 7 requests one selected CPU to process the PDU after storing the data comprising the PDU to be transmitted into the shared memory 2. The method for selecting one of the CPUs from the plurality of CPUs is substantially the same as that of FIG. 3 where the CPU is selected when the line interface 3 receives the PDU 3.

In FIG. 1, FIG. 7 and FIG. 8, the local bus 4 between the CPU 1 and the shared memory 2 is separated from the bus 6. This is because the bus 4 can access the shared memory in a short time and also lessen the traffic on the bus 6. The CPU 1 and the shared memory 2 may be connected directly to the bus 6 without the local bus 4. In that case, the above advantages can not obtained and the performance will be a little degraded. But there is no problem for processing a series of protocols by an arbitrary CPU.

According to the first aspect of the invention, the system requests the CPU corresponding to the remote address and each protocol data to process the jobs, when a communication process for a plurality of protocol data is executed. According to the present invention, the system can carry out processes corresponding to a plurality of protocol data on the plurality of CPUs. Therefore, a protocol processing apparatus can be obtained for processing the jobs so as to attain the maximum CPU advantage.

According to the second aspect of the invention, the system requests the CPU having the physical number corresponding to the connection number which is a logical number by which the PDU is transferred when the communication process starts. According to the present invention, the system can carry out processes corresponding to a plurality of connection on the plurality of CPUs. Therefore, a protocol processing apparatus can be obtained for processing the jobs so as to attain the maximum CPU advantage.

What is claimed is:

1. A protocol parallel processing apparatus, comprising:

a plurality of CPUs for processing a plurality of protocol data units;

a shared memory accessible by each of the plurality of CPUs for storing a CPU state table, that associates each of the plurality of CPUs with an idle flag indicative of whether a CPU is currently processing a protocol data unit, a remote address indicative of a remote node identified by a protocol data unit, and a process start time indicative of a time at which each CPU begins processing a protocol data unit; and at least one line interface, coupled to the shared memory, including means for writing a remote address into the CPU state table when a protocol data unit is processed, and means for requesting one of the plurality of CPUs whose idle flag indicates that the CPU is idle to process the protocol data unit, and, means operative when no CPU is idle, for requesting a CPU with an oldest process start time to process the protocol data unit if none of the plurality of CPUs is idle.

2. A protocol parallel processing apparatus of claim 1, further comprising a host processor coupled to the at least one line interface and the shared memory, for receiving a protocol data unit and selecting one of the plurality of CPUs to process the protocol data unit.

3. The protocol processing apparatus of claim 1, wherein the at least one line interface further searches the CPU state table and selects one of the plurality of CPUs for processing the protocol data unit whose remote address matches the remote address of the protocol data unit.

4. The protocol processing apparatus of claim 1, wherein the CPU state table in the shared memory further associates each of the plurality of CPUs with a logical channel number indicative of a remote node identified by the protocol data unit.

5. A protocol parallel processing apparatus, comprising:

a plurality of CPUs for processing a plurality of protocol data units;

a shared memory accessible by each of the plurality of CPUs for storing a CPU state table that associates each of the plurality of CPUs with an idle flag, a connection number, and a process start time; and at least one line interface, coupled to the shared memory, including means for writing a connection number into the CPU state table, and requesting one of the plurality of CPUs whose idle flag indicates that it is idle to process the protocol data unit, and means, operative when no CPU is idle, for requesting a CPU having an oldest process start time to process the protocol data unit if none of the plurality of CPUs is idle.

6. A protocol parallel processing apparatus of claim 5, further comprising a host processor coupled to the at least one line interface and the shared memory, for receiving a protocol data unit and selecting one of the plurality of CPUs to process the protocol data unit.

7. The protocol processing apparatus of claim 5, wherein the at least one line interface further searches the CPU state table and selects one of the plurality of CPUs for processing the protocol data unit whose connection number matches the connection number of the protocol data unit.

8. A computer-implemented process for allocating a plurality of parallel CPUs, that share a common memory and network line interface, to process protocol data units (PDUs) in a network communication system, comprising the steps, performed by at least one of the plurality of CPU's, of:

A) writing, by each CPU, an idle flag in the common memory to indicate whether the CPU is presently processing a PDU;

B) writing, by each CPU, a process starting time in the common memory to indicate a time at which the CPU begins processing a PDU, the method further comprising the steps of:

C) allocating, by the line interface in response to at least one CPU being idle, a received PDU to an idle CPU; and D) allocating, by the line interface in response to no CPUs being idle, the received PDU to a CPU with an oldest process starting time.

9. The method of claim 8, further comprising the step of:

storing a remote node identifier to identify an origin of a PDU being processed, if any, for each of the plurality of CPUs.

10. The method of claim 9, wherein, upon completion of processing a PDU, the method further comprises the step of storing constant values for the idle flag, the processor start time, and the remote node identifier indicative of an idle state.

11. A parallel data processing apparatus, comprising:

a plurality of CPUs joined together by a common bus;

a common memory coupled to the common bus;

means for determining, within the common memory, whether each of the plurality of CPUs is busy processing a protocol data unit (PDU);

means for recording, within the common memory, a process start time for each of the plurality of CPUs, indicative of a time at which each CPU began processing a PDU;

means for searching the common memory for a CPU from the plurality of CPUs that is idle;

means, responsive to the means for searching, for selecting a CPU that is idle, if one is found, and for selecting a CPU having an oldest process start time, if each of the plurality of CPUs is busy.

12. The apparatus of claim 11, further comprising:

means for recording an address, for each of the plurality of CPUs, into the common memory, indicative of a remote node designated by a PDU processed by each of the plurality of CPUs.

13. The apparatus of claim 12, further comprising:

means for determining whether an address conveyed by a PDU matches an address recorded by the means for recording; and means for selecting a CPU whose recorded address matches the address conveyed by the PDU.

14. A protocol parallel processing apparatus, comprising:

a plurality of CPUs for processing a plurality of protocol data units;

a shared memory accessible by each of the plurality of CPUs for storing a CPU state table, that associates each of the plurality of CPUs with an idle flag indicative of whether a CPU is currently processing a protocol data unit, an identifier indicative of a remote node of a protocol data unit, and a process start time indicative of a time at which each CPU begins processing a protocol data unit;

at least one line interface, coupled to the shared memory, including means for writing a remote address into the CPU state table when a protocol data unit is processed, and means for requesting one of the plurality of CPUs whose idle flag indicates that the CPU is idle to process the protocol data unit; and means, operative when no CPU is idle, for requesting a CPU with an oldest process start time to process the protocol data unit.

15. The apparatus of claim 14, wherein the identifier indicative of a remote node is a remote address.

16. The apparatus of claim 14, wherein the identifier indicative of a remote node is a connection number.

17. A protocol parallel processing apparatus, comprising:

a plurality of CPUs for processing a plurality of protocol data units;

a shared memory accessible by each of the plurality of CPUs for storing a CPU state table, that associates each of the plurality of CPUs with an idle flag indicative of whether a CPU is currently processing a protocol data unit, an identifier indicative of a remote node of a protocol data unit, and a process start time indicative of a time at which each CPU begins processing a protocol data unit; and at least one line interface, coupled to the shared memory, including means for writing a remote address into the CPU state table when a protocol data unit is processed, and means, responsive to no CPU being idle, for requesting one of the plurality of CPUs with an oldest process start time to process the protocol data unit.

18. The apparatus of claim 17, further including means, responsive to at least one of the plurality of CPUs being idle, for requesting a CPU whose idle flag indicates that the CPU is idle to process the protocol data unit.

19. The apparatus of claim 17, wherein the identifier indicative of a remote node is a remote address.

20. The apparatus of claim 17, wherein the identifier indicative of a remote node is a connection number.

* * * * *